United States Patent Office 3,096,325
Patented July 2, 1963

3,096,325
PREPARATION OF 3-CHLOROCAPROLACTAM
Roger J. Tull, Plainfield, N.J., assignor to Merck & Co., Inc., Rahway, N.J., a corporation of New Jersey
No Drawing. Filed Jan. 29, 1962, Ser. No. 169,655
5 Claims. (Cl. 260—239.3)

This invention relates to an improved process for the preparation of 3-chlorocaprolactam. More particularly, it is concerned with a method of converting N-benzoyl-3-chlorocaprolactam to 3-chlorocaprolactam.

The compound 3-chlorocaprolactam can be converted to the amino acid lysine in accordance with methods known in this art. Lysine, 2,6-diaminohexanoic acid is one of the essential amino acids which is necessary for the maintenance of health and the proper assimilation of foods in animals.

It is an object of the present invention to provide a new method of producing 3-chlorocaprolactam whereby this product can be obtained economically on a commercial scale. Other objects will be apparent from the detailed description of my invention hereinafter provided.

In accordance with the present invention, it is now found that 3-chlorocaprolactam can be prepared by intimately contacting N-benzoyl-3-chlorocaprolactam with sulfuric acid. This reaction can be shown structurally as follows:

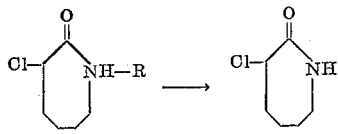

wherein R represents benzoyl.

In carrying out the process of this invention commercially, it is found preferable to use sulfuric acid containing at least 90% $H_2SO_4$. Generally, it is preferred to use the commercially available concentrated sulfuric acid which contains about 93.5% $H_2SO_4$, since maximum yields of the desired product can be obtained when the reaction is carried out with this acid under optimum conditions. However, other concentrated sulfuric acids containing at least 90% $H_2SO_4$ or fuming sulfuric acid (oleum) can also be used in my process.

The process is conveniently effected by adding the N-benzoyl-3-chlorocaprolactam to the sulfuric acid and allowing the reaction mixture to stand for sufficient time to complete the reaction. Generally, I find it desirable to heat the reaction mixture to a temperature not in excess of about 50° C. to complete the reaction in a shorter time.

Pursuant to a further embodiment of my invention, I have found that the 3-chlorocaprolactam is readily recovered from the reaction mixture by adding water to the reaction mixture, making the resulting aqueous solution alkaline, and extracting the product with a suitable water immiscible product. Any base can be used to neutralize the aqueous solution of the reaction mixture, but generally it is preferred to use an inorganic base such as an alkali metal hydroxide or ammonium hydroxide. Water immiscible solvents for 3-chlorocaprolactam suitable for extracting the product from the aqueous alkaline solutions that might be mentioned are chloroform, benzene, toluene and the like.

The following example illustrates a method of producing 3-chlorocaprolactam in accordance with this invention.

Example

*3-chlorocaprolactam.*—N-benzoyl-3-chlorocaprolactam (100.4 g.) was added to 140 cc. of concentrated sulfuric acid with stirring, the temperature being kept below 25° C. The mixture was stirred for one hour without external heating (temperature rose to 38° C.) and then heated at about 50° C. for two hours. The mixture was cooled to 25° C. and poured onto 1 kg. of a mixture of ice and water. The mixture was made alkaline by addition of 400 cc. of 28% ammonium hydroxide, the temperature being kept below 20° and extracted with 3×500 cc. of chloroform. The chloroform extracts were combined and evaporated to give 56.2 g. (95.3%) of 3-chlorocaprolactam. M.P. 91.5–94° C.

Various changes and modifications of the invention can be made and, to the extent that such variations incorporate the spirit of this invention, they are intended to be included within the scope of the appended claims.

What is claimed is:

1. A process for the preparation of 3-chlorocaprolactam which comprises reacting N-benzoyl-3-chlorocaprolactam with sulfuric acid.

2. The process which comprises reacting N-benzoyl-3-chlorocaprolactam with sulfuric acid containing not less than about 90% $H_2SO_4$ and recovering 3-chlorocaprolactam from the resulting reaction mixture.

3. The process which comprises reacting N-benzoyl-3-chlorocaprolactam with sulfuric acid containing not less than about 90% $H_2SO_4$, adding water to the resulting reaction mixture, making the aqueous solution alkaline, extracting the aqueous alkaline solution with a water immiscible solvent and evaporating the solvent solution to obtain 3-chlorocaprolactam.

4. The process of claim 3 wherein the immiscible solvent is choloroform.

5. The process of claim 3 wherein the immiscible solvent is benzene.

References Cited in the file of this patent

UNITED STATES PATENTS 2,877,220    O'Neill et al. _____ Mar. 10, 1959

FOREIGN PATENTS 855,260    Germany _____ Nov. 10, 1952
945,926    Germany _____ July 19, 1956